(12) United States Patent
Lassota et al.

(10) Patent No.: US 8,516,947 B1
(45) Date of Patent: Aug. 27, 2013

(54) FOOD EQUIPMENT HOUSING WITH ARCUATE PANELS

(75) Inventors: Zbigniew G. Lassota, Long Grove, IL (US); Bartosz Sokolski, Elmwood Park, IL (US)

(73) Assignee: Food Equipment Technologies Company, Inc, Lake Zurich, IL (US)

( * ) Notice: Subject to any disclaimer, the term of this patent is extended or adjusted under 35 U.S.C. 154(b) by 2115 days.

(21) Appl. No.: 10/884,149

(22) Filed: Jul. 2, 2004

Related U.S. Application Data

(63) Continuation-in-part of application No. 29/180,329, filed on Apr. 23, 2003, now abandoned, and a continuation-in-part of application No. 29/180,316, filed on Apr. 22, 2003, now Pat. No. Des. 498,111, and a continuation-in-part of application No. 29/180,336, filed on Apr. 22, 2003, now Pat. No. Des. 495,197, and a continuation-in-part of application No. 29/180,317, filed on Apr. 22, 2003, now Pat. No. Des. 497,075.

(51) Int. Cl.
*A47J 31/00* (2006.01)

(52) U.S. Cl.
USPC .............................. 99/284; 99/279

(58) Field of Classification Search
USPC ............... 99/284, 279, 275, 290; 222/146.2, 222/146.5; 29/897.2, 421.1, 557, 525.14
See application file for complete search history.

(56) References Cited

U.S. PATENT DOCUMENTS

| | | | | |
|---|---|---|---|---|
| 1,601,403 A * | 9/1926 | McGuire | | 99/284 |
| 3,561,638 A * | 2/1971 | Morjan | | 220/611 |
| 4,038,914 A * | 8/1977 | Crespo et al. | | 99/279 |
| 4,676,148 A * | 6/1987 | Foley | | 99/279 |
| 4,917,005 A * | 4/1990 | Knepler | | 99/280 |
| 5,142,610 A * | 8/1992 | Augustine et al. | | 392/442 |
| 6,269,735 B1 * | 8/2001 | Rolfes | | 99/279 |
| 6,557,233 B1 * | 5/2003 | Rosch | | 29/421.1 |
| 6,588,084 B2 * | 7/2003 | Dudziak | | 29/421.1 |
| 6,684,475 B2 * | 2/2004 | Geissler et al. | | 29/421.1 |
| 6,739,241 B2 * | 5/2004 | Long et al. | | 99/288 |

* cited by examiner

Primary Examiner — Reginald L Alexander
(74) Attorney, Agent, or Firm — Potthast & Associates

(57) ABSTRACT

A food processing apparatus (20) such as a coffee brewer having functional elements (45) protectively contained with a housing assembly (43) composed off a wall assembly (44, 448, 44B) having wall panels (58, 60, 62 and 64) being formed from a single, thin-sheet, metallic work piece (50) that extend between corners (66, 68, 70 and 72) formed in the work piece by folding the work piece (50) at each of the corners with at least one fold having an angle substantially different from a right angle. After the corners are formed, opposite ends (52, 54) of the work piece are aligned in abutting relationship at a location laterally spaced from all the plurality of corners and permanently welded together with a weld joint (56). As a result of bringing together the opposite ends, at least one of the panels is stressed into an arcuate shape and also forms interior corner angles at opposite sides that are substantially different from a right angle. A closure base (48) is attached to the bottom of the wall assembly (44) to close and support the open bottom of the wall assembly (44), and a closure top (46) attached to, supported by and closes the open top of the wall assembly (44).

46 Claims, 7 Drawing Sheets

FOOD EQUIPMENT HOUSING WITH ARCUATE PANELS

CROSS-REFERENCE TO RELATED APPLICATION

This application is a continuation-in-part of and claims the benefit under 35 USC 120 of the following applications of the co-inventors of the present invention: U.S. Ser. Nos. 29/180,329; 29/180,316; 29/180,336 and 29/180,317, all filed on Apr. 22, 2003, and all hereby incorporated by reference.

BACKGROUND OF THE INVENTION

1. Field of the Invention

This invention relates generally to food equipment, such as commercial coffee brewers, tea brewers, iced tea brewers, hot water dispensers, coffee bean grinders or other food grinders, insulated beverage dispensers, and other food equipment used to either prepare or dispense food or beverages or ingredients, and more particularly to such food equipment with protective housings and methods of making such housings.

2. Discussion of the Prior Art

All know food equipment housings of the type having housings with a housing wall assembly having four planer walls that are generally made from thin-walled, stainless steel, or the like. Such stainless steel is required for purposes of hygiene and maintenance of an attractive and clean outward appearance. These four planer panels are sometimes formed from a single rectangular work-piece that is provided with right angles, or 90-degree, bends or corners. After the right angle bends are formed, the distal ends are pulled together and permanently welded together to form the rectilinear, housing wall sub-assembly. The finished housing wall assembly has a rectangular cross section with two pairs of opposite walls that are parallel to each other. Each wall of each pair of parallel walls is perpendicular to the two walls of the other pair of parallel walls. Both of the opposite ends of the rectilinear housing wall assembly are open and must be closed by other elements of the housing.

Generally, one of the open ends is fitted onto a rectilinear base sub-assembly that may be made of plastic or the like. Likewise, the other open end is fitted with a top cover sub-assembly that may also be made of plastic and includes an access opening and a movably mounted closure for selectively closing the access opening. The base sub-assembly has a rectangular shaped, outer, perimeter ledge surrounding an inner, upwardly standing, rectangular shaped, bottom lateral support member that is received within the open bottom of the rectilinear housing wall assembly. The rectilinear housing wall assembly is fitted over the inner lateral support member with the inner surface of the walls adjacent the bottom pressed against the lateral support member. The bottom edge of the rectilinear housing wall assembly rests upon the outer, perimeter ledge. The width of the outer perimeter ledge is substantially equal to the width of the thin walls of the rectilinear housing wall assembly and the outer surface of the walls forms a generally smooth continuous surface with the outer surface of the base beneath the ledge.

Likewise, the top cover sub-assembly has a rectangular shaped, outer, perimeter, downwardly facing shoulder surrounding an inner, downwardly extending, rectangular shaped, top lateral support member that is received within the open top of the rectilinear housing wall assembly. The rectilinear housing wall assembly is fitted around the inner lateral support member with the inner surface of the walls adjacent the top, pressed against the top lateral support member. The downwardly facing shoulder rests upon the top edge of the rectilinear housing wall assembly that thereby supports the top cover sub-assembly. The width of the outer perimeter shoulder is substantially equal to the width of the thin walls of the rectilinear housing wall assembly and the outer surface of the walls forms a generally smooth continuous surface with the outer surface of the top cover above the shoulder.

While suitable rectilinear housings made by this technique, there some disadvantages. Because the walls have a planer thin wall construction with a thickness in a range from 16-gage to 24-gage, for instance, the finished housing wall assembly is easily generally distorted to a non-rectangular shape and the individual walls are easily distorted to a non-planer configuration before being mounted to the base sub-assembly and the top cover sub-assembly, as described above. Generally, the rigidity may be improved by increasing the thickness of the work piece of the wall assembly but this adds to the cost of materials and also to the weight of the finished housing assembly and the food equipment employing the heavier housing.

SUMMARY OF THE INVENTION

It is therefore the object of the present invention to provide food equipment with a housing having a housing wall assembly and a method of making food equipment with a housing having a wall assembly that overcomes or reduces the problems or disadvantages noted above with respect to food equipment with rectangular metal housing wall assemblies.

This objective is achieved in part by providing in a food processing apparatus having functional elements for the processing of food, a housing assembly for protectively enclosing the elements having a tubular wall assembly with an open top and an open bottom with cross-sectional shapes that are substantially the same and having a plurality of integral, metallic panels extending vertically between the top and the bottom, said panels being formed from a single, thin-sheet, metallic work piece that extends laterally between an equal plurality of corners formed in the work piece by folding the work piece at each of the corners and a weld joint fixedly attaching together opposite ends of the work piece at a location laterally spaced from all the plurality of corners, and in which at least one of the panels being stressed into an arcuate shape and forming corner angles at opposite ends of the at least one of the panels that are substantially different from a right angle, a closure base attached to the bottom of the wall assembly to close and support the open bottom of the wall assembly and a closure top attached to, supported by and closing the open top.

Preferably, the closure base has an upwardly facing ledge for underlying support of the bottom of the tubular wall assembly, said ledge having a shape that closely conforms to the shape of the bottom of the tubular wall assembly including an arcuate section that conforms to the arcuate shape of the bottom of the at least one panel and the corner angles that are substantially different from a right angle. In addition, the ledge has an inner side and an outer side, and the closure base includes a lateral support mounting wall that extends upwardly from the inner side of and conforms in shape to the ledge, said support wall blocking lateral movement of the bottom of the wall assembly off the ledge. Similarly, the closure top has a downwardly facing shoulder for support by the top of the tubular wall assembly, said shoulder having a shape that closely conforms to the shape of the top of the tubular wall assembly including an arcuate section that conforms to the arcuate shape of the top of the at least one panel and the corner angles that are substantially different from a right angle.

The objective is also obtained by providing in a food processing apparatus having functional elements for the processing of food, a housing assembly for protectively enclosing the element, having a thin-walled, integrally formed, steel wall assembly with an open top and an open bottom having extending between the top and the bottom a back planer panel, a front planer panel, a pair of opposite, outwardly curved side panels joined at opposite back and front sides to the back panel and the front panel and forming obtuse angles therewith, a base closure for supporting the wall assembly in an upright position, a top closure attached to a top of the wall assembly.

Preferably, the base closure has a support ledge for supporting the wall assembly with a shape that conforms to a cross-sectional shape of the wall assembly with a pair of opposite, parallel, front and back straight sections for support of the front panel and the back panel joined to a pair of opposite outwardly curved sections. Also, base closure has a forward section with a slot having a bottom defining a front straight section of the support ledge positioned to mate with the bottom of the front panel when the bottom of the back panel and the side panels mate with the back section and the pair of outwardly curved side sections. Preferably, the panels have a preselected thickness and the support ledge has a width that is substantially equal to the thickness. Preferably, an upwardly extending lateral support wall that conforms to the shape of the support ledge and extends along an interior edge of the support ledge sections located without the slot is also provided. Similarly, the top closure has a support shoulder supporting by the top of the wall assembly with a shape that conforms to a cross-sectional shape of the top of the wall assembly with a pair of opposite, parallel, front and back straight sections for support by the front panel and the back panel joined to a pair of opposite outwardly curved side sections for support by the outwardly curved panels.

In the preferred embodiment, all the panels are integrally formed from a single, thin-walled work piece that has four folds defining the ends of the panels and a weld joint in one of the panels attaching together opposite ends of the work piece. Preferably, the work piece is made of stainless steel, and the pair of outwardly curved side panels is in a state of resilient stress,

BRIEF DESCRIPTION OF THE DRAWINGS

The foregoing objects, advantages and features of the food equipment apparatus of the present invention and method of making same will be described in greater details and other advantageous features will be made apparent from a detailed description of an embodiment of the invention provided below with reference to the several figures of the drawing, in which.

DETAILED DESCRIPTION

A food equipment housing constructed in accordance with the present invention has a non-rectilinear shape formed from a non-rectilinear housing wall assembly in combination with congruent, non-rectilinear base sub assembly and a congruent, non-rectilinear cover sub-assembly. The non-rectilinear housing assembly, instead of having all planer walls, has at least one, and preferably four, arched walls that give the housing assembly increased later strength and resistance against distortion. Because of the increased strength, lighter gage steel may be used to achieve the same degree of rigidity as obtained with a rectilinear housing wall assembly to reduce cost and weight of the housing wall assembly. Preferably, at least the sidewalls are curved, outwardly, i.e. are convex walls. In such case, the convex, arch-like, outward curvature is obtained by creating folds in a planer, rectangular work piece to form four corners with internal angles that are slightly larger than 90-degrees, such as 95 to 120-degrees. When the opposed ends of the work piece are welded to each other in aligned abutment, the resultant configuration is a tubular shape with four bent corners greater than 90-degrees Preferably, the front and back wall panels are kept planer while the sidewall panels are caused to curve outwardly.

The exact location and angles that are to be used for a particular configuration are generally determined experimentally with a sample work piece, but greater the angle of the bend at the corners at the opposite ends of a wall exceeds of is less than ninety degrees, the greater the amount of curvature of the wall.

In an alternative embodiment, all four walls are curved inwardly, i.e. are concave walls. In such case, the concave, arch-like, outward curvature is obtained by creating four folds in a planer, rectangular work piece to form four corners with internal angles that are slightly less than 90-degrees, such as 85-degrees to 75-degrees. When the opposed ends of the work piece are welded to each other in aligned abutment, the resultant configuration is a tubular shape with four bent corners less than 90-degrees and four inwardly curved concave walls that extend between the four bent corners. The smaller the angle of the bend at the corners at opposite ends of a wall, the greater the amount of concavity of the wall.

The amount of curvature may be different for different walls but preferably the curvature of opposite walls are the same to provide center-line symmetry to the food equipment and the housing.

In other embodiments, one or one pair of walls is convex while the other walls are concave, or vice versa, or one wall or one pair of opposite walls is planer while the other walls are convex, concave or both, and vice versa.

In accordance with the preferred embodiment, the base and the top cover are both provided with a peripheral ledge, or shoulder, that has a shape or configuration conformed to that of the open end of the non-rectilinear housing wall assembly. Because of the improved rigidity of the non-rectilinear housing assembly of the present invention, it better keeps its shape in conformity with the fixed shape of the peripheral ledge or shoulder and this facilitates easy connection and assembly of the wall assembly with the base and the top cover assembly.

Figures 1, 2, 3:
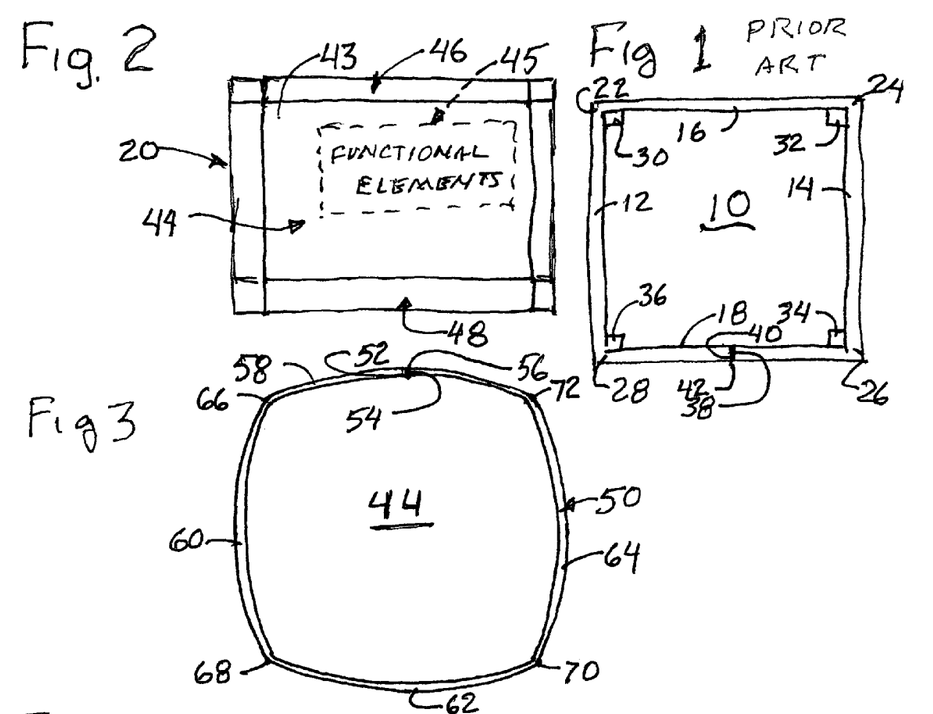
FIG. 1 is a plan view of a PRIOR ART rectilinear housing wall assembly in the shape of a rectangle.
FIG. 2 is a front elevation, schematic view of food equipment apparatus of the present invention having a thin-walled steel housing wall assembly mounted with a plastic base sub-assembly and a plastic top cover sub-assembly.
FIG. 3 is a plan view of one embodiment of the non-rectilinear housing wall assembly of FIG. 1 in which all of the walls are convex.

Before describing the embodiments of the present invention, reference should first be made to the drawing of FIG. 1 that depicts a plan view of the rectilinear housing wall assembly 10 of the prior art. The housing wall assembly 10 is characterized by four planer walls 12, 14, 16 and 18 that are joined together at four corners 22, 24, 26 and 28. The planer walls form 90-degree right angles 30, 32, 34 and 36. The housing wall assembly is made from an integral, planer, rectangular, steel work-piece that is pre-bent at the 90-degree angles. The opposed ends of the work-piece 38 and 40 are then brought together in abutting alignment and then fixedly secured together by means of a weld joint 42. Because of the planar walls 12-18 are relatively are flexible in a transverse direction the rectangular configuration may distort to a non-rectangular parallelogram or otherwise and thereby making mounting of the housing wall assembly to the fixed rectangular base a difficulty.

Referring now to FIGS. 2 and 3, the preferred embodiment of the food ingredient apparatus 20 of the present invention with a curved wall non-rectilinear housing 43 is seen to include a non-rectilinear, curved, housing wall assembly 44 extending between a base assembly, or base, 46 and a top cover assembly, or cover, 48. Functional elements 45 are protectively contained within the housing assembly 43. The housing wall assembly 44 has four corners defined by bends in a single rectangular, thin walled planer work piece 50 with opposite ends 52 and 54. The work piece is flexed to a position in which the opposite ends 52 and 54 are in aligned abutting relationship and then fixedly secured together by a suitable weld joint 56. There are four, convex, outwardly curved, arcuate, thin, walls 58, 60, 62 and 64 defined by bends at corners 66, 68, 70 and 72. Convex wall 58 is defined by the two distal wall sections extending between the corner 66 and the distal end 54 and between the corner 72 and the end 52, respectively, that are joined together by the weld joint 56. The interior angles formed by the juncture of the pairs of walls at the corners 66, 68, 70 and 72 are obtuse, being larger than ninety-degrees, and are preferably in the range of 95-degrees to 110-degrees. All of the angles of the four corners are the same and the length of each of the walls 60, 62, 64 and 66 are the same and the straight distance between all adjacent corners are equal to each other, with the four corners being located at the four corners of an imaginary rectilinear square. The walls are preferably made of thin walled stainless steel preferably having a thickness in the range of 18-gage to 24-gage. The height of the walls are all equal, being integrally formed from a work piece that is rectangular, and have a dimension of approximately six-inches to three feet depending upon the size and type of food equipment for which the housing wall assembly is designed, such as an insulated dispenser, brewer, grinder, etc. of varying size and capacities.

Figures 4, 5:
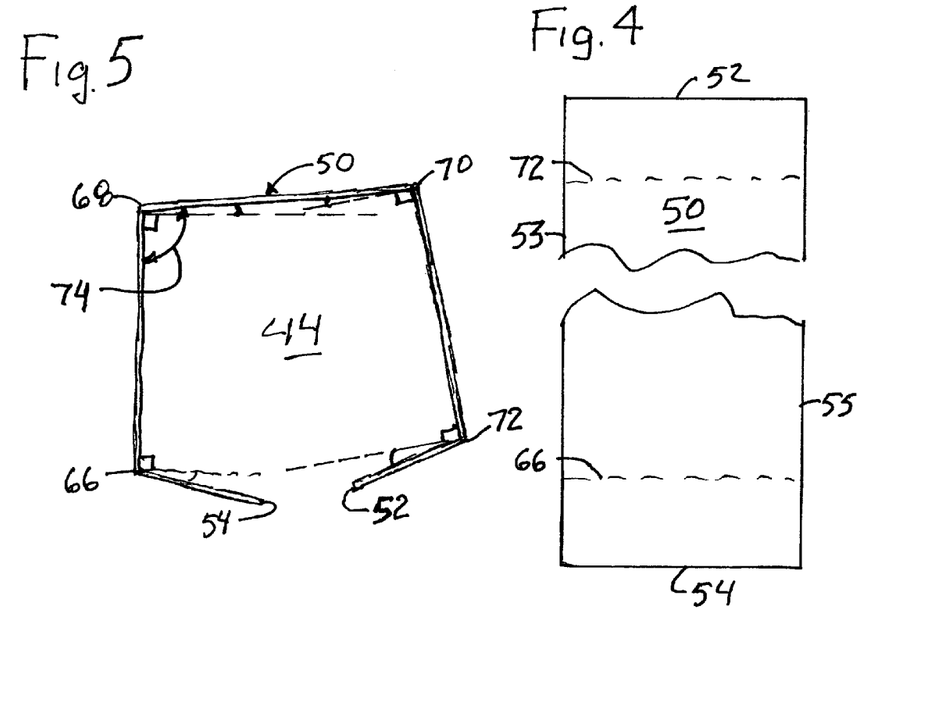
FIG. 4 is a plan view illustration of the bends made in a rectangular work-piece to form the completed wall assembly of FIG. 6 with all concave walls.
FIG. 5 is a plan view illustration of the bends made in a rectangular work-piece to form the completed wall assembly of FIG. 3 in which all of the walls are convex.

During manufacture of the housing wall assembly 44, an elongate work piece shown in FIG. 4 is pre-bent along bend lines that coincide with the desired location of the corners 66, 68, 70 and 72, such as indicated by broken-line representations of the bend lines for bends 66 and 72. The bends are parallel to the opposite ends 52 and 54 and are perpendicular to a bottom edge 53 and a top edge 55, which, in turn, are parallel to each other. As seen in FIG. 5, the internal angles 74 formed at these bend lines are equal and are all obtuse angles, being significantly larger than 90-degrees. Consequently, when the two opposite ends are brought together as shown in FIG. 3, the walls 58, 60, 62 and 64, all spontaneously bow outwardly as shown. The amount by which the wall bow outwardly from what would otherwise be a rectangular configuration in a conventional housing wall assembly is directly proportional to the extent of obtuseness of the angle 74. The greater amount the angle 74 exceeds 90-degrees, the greater the amount of bowing.

Advantageously, in the arcuate housing wall assembly 44 of the present invention, bowing of the walls strengthens the walls individually and the cross section of the entire assembly 44 against distortion. In a conventional, rectilinear, housing assembly 10, when the four 90-degree bends are made, the abutting edges 40 and 42 naturally come together to form a rectangle and do not have to be forcibly held together against any resilient force that would be imparted by the work piece 50 due the edges 40 and 42 not being in abutment after the four right angle folds or bends are made. Because they are planer or flat and there is no spring tension or stress in the walls 12, 14, 16 and 18, the planer walls are relatively flexible, and the cross section of the entire planer housing wall assembly 10 is subject to distortion to the shape of a nonrectangular parallelogram.

On the other hand, in the arcuate housing assembly 44 of the present invention, after the four obtuse bends are made at the corners 68, 70, 72 and 74, the opposite ends are not naturally in an abutting relationship, but instead are space from each other by a significant distance. The greater the internal angle 74, the greater will be the distance separating the opposite ends of the work piece 50. Regardless of the dimension of the separation distance, because there is a significant separation distance, the opposite ends 54 and 56 must be forced together against the spring tension of the steel work piece tending to return the work piece to a non-stressed configuration shown in FIG. 5 in which the opposite ends are spaced from each other. With the ends being forced into abutting relationship, the entire housing wall assembly 44 is put under stress, and the walls are forced to bow outwardly as shown in FIG. 3. After the ends 52 and 54 are secured together by the weld joint 56, the walls 58, 60, 62 and 64 remain under stress and significantly more strongly resist either inward or outward movement and any distortion of the cross section of the entire housing wall assembly 44 than do the walls of the prior art housing wall assembly 10.

In the food equipment apparatus 20, the base 48 of the housing assembly is formed of molded plastic and has a mounting ledge 73 with a shape that is intended to precisely conform to the finished cross sectional shape shown in FIG. 3. In the embodiment shown in FIG. 6, the base 48 is seen to include the peripheral ledge 73 with an upwardly facing support surface 74 upon which the bottom edge 53 of the wall assembly 44 is supported. If the thickness 76 of the walls 58, 56, 58 and 60 of the arcuate wall assembly 44 is substantially equal to the thickness, or width, 78 of the of the upwardly facing support surface of the peripheral ledge 73 a continuous wall is formed. In such case, the outer surface 78 of the base 48, adjacent the bottom of the wall assembly 44, mates evenly and uniformly with the outside surface 82 of the wall assembly 44 to form a smooth, composite continuous surface 84 at the juncture of the bottom of the wall assembly 53 and the support surface 74. This smooth, composite, continuous surface 82 has the same cross sectional shape and dimension as outside surface 82 of wall assembly 44 and extends from the wall assembly 44 to the bottom 86 of the base 48 around the entire periphery to form the smooth composite surface 82 around the entire periphery of both the wall assembly 44 and the base 48.

Figures 6, 7:
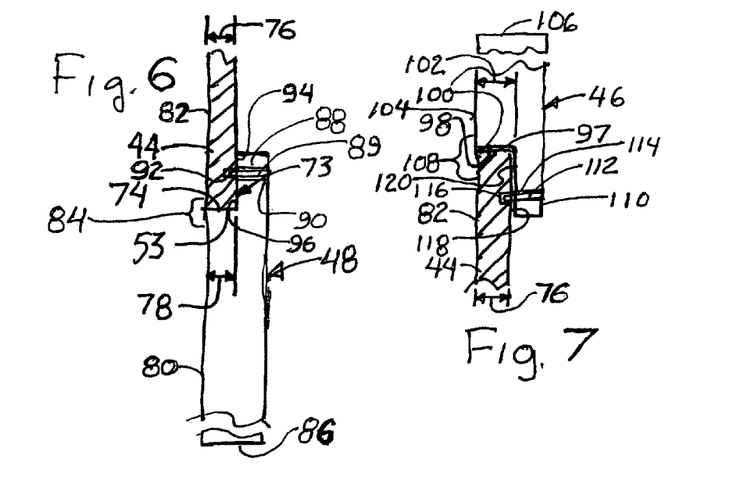
FIG. 6 is an enlarged cross section of the juncture of the end of a housing wall assembly and the base sub-assembly, or base, of FIG. 2.
FIG. 7 is an enlarged cross section of the juncture of the top end of a housing wall assembly with the top cover assembly, of FIG. 2.

The ledge 73 is defined in part by an upstanding, annular collar, or neck, 88 that extends upwardly from the underlying support surface 74 by a sufficient distance to enable support of a radial fastener 89. The radial fastener 89 may be a screw, bolt, pin or other fastener that suitably secures the wall assembly 44 against vertical separation from the base 48 by passing through aligned pairs of holes 90 and 92 in the neck 88 and in the bottom of the wall assembly 44 adjacent the neck 88, respectively. Alternatively, detent fasteners, adhesive, or other bonding is used to secure the wall assembly 44 to the base 48. The closed neck 88 is also snugly received within the bottom of the wall assembly 44 with the inside surface 94 of the wall assembly pressed against the outside surface 96 of the neck for an improved frictional inter-engagement.

Advantageously, although having arcuate walls 58, 60, 62, and 64, because the cross-sectional shape still has corners and thus a non-cylindrical, cross-sectional shape, once the neck 88 is snugly received within the bottom opening of the wall assembly 44, any pairs of aligned mounting holes 90 and 92 will be correctly located and aligned automatically and relative rotation is and resultant misalignment during assembly is inherently prevented.

Referring to FIG. 7, the top 46 is mounted to the top of the housing assembly 44 in a manner similar to the mounting of the base 48 to the housing assembly 44. In the food equipment apparatus 20, the top 46 is preferably formed of molded plastic and has a cross-sectional shape that is intended to precisely conform to the finished cross sectional shape shown in FIG. 3. Referring to FIG. 7, the top 46 is seen to include an inwardly extending peripheral shoulder 97 with a downwardly facing support surface 98 that rests upon and is supported by the top edge, or top, 100 of the wall assembly 44. If the thickness 76 of the walls 58, 56, 58 and 60 of the arcuate wall assembly 44 is substantially equal to the thickness, or width, 102 of the of the downwardly facing support surface 98 of the peripheral shoulder 97, a continuous wall is formed. In such case, the outer surface 104 of the top 46, adjacent the top 106 of the wall assembly 44, mates evenly and uniformly with the outside surface 82 of the wall assembly 44 to form a smooth, composite continuous outer surface 108 at the juncture of the top 100 of the wall assembly and the downwardly facing surface 98 of the shoulder 97. This smooth, composite continuous surface 108 has the same cross-sectional shape and dimension as that of the outside surface 82 of wall assembly 44 and extends from the top of the wall assembly 44 to the top 106 of the top 46 around the entire periphery to form the smooth composite surface 82 around the entire periphery of both the wall assembly 44 and the top 47.

The shoulder 97 is defined in part by an inwardly recessed, downwardly extending, closed collar, or neck, 110 that extends downwardly from the overlying surface 98 by a sufficient distance to enable support of a radial fastener 112. The radial fastener 112 may be a screw, bolt, pin or other fastener that suitably secures the wall assembly 44 against separation from the top 46 by passing through aligned pairs of holes 114 and 116 in the downwardly extending neck 110 and in the bottom of the wall assembly 44 adjacent the downwardly extending neck 110, respectively. Alternatively, detent fasteners or adhesive or other bonding is used to secure the wall assembly 44 to the top 48. The closed neck 110 is also snugly received within the top of the wall assembly 44 with the inside surface 118 of the wall assembly pressed against the inside surface 120 of the neck for an improved frictional inter-engagement.

Advantageously, although having arcuate walls 58, 60, 62, and 64, because the cross-sectional shape still has corners and a non-cylindrical, cross-sectional shape, once the neck 110 is snugly received within the top opening of the wall assembly 44, any pairs of aligned mounting holes 114 and 116 will be correctly located and aligned automatically. Unlike, cylindrical housings, relative rotation and resultant misalignment during assembly are inherently prevented.

The improved rigidity of the cross-sectional shape of the wall assembly 44 facilitates assembly and enables tighter tolerances for the fit between the wall assembly 44 and the base 48 and top 46. In the known housings made in a rectangular shape, the relative flexibility of the planer wall sometimes results in cross-sectional distortion such that the wall planer wall assembly will not fit over the neck of the base or, if there is a fit, the fit is not a snug fit. Likewise, cylindrical housing assemblies may easily be distorted to a non-circular cross-section that will not fit properly as intended with a circular base, or if fitted, the associated pairs of mounting holes in the wall assembly and the base must be located and aligned and are not self-aligning, as in the arcuate cornered housing assembly 20 of the present invention. Because of the improved cross-sectional rigidity, relatively smaller gage metal may be used to form the housing wall assembly 44 than would be required to achieve the same degree of rigidity in a housing assembly having a rectilinear configuration.

It should be appreciated that the improved cross-sectional rigidity of the housing wall assembly 44 is beneficial even when not used with a base like base 48 of FIG. 2 or a top like top 46 of FIG. 2, in which all sides of the wall assembly are aligned with walls of the housing and base sub-assemblies. The concepts of the invention are also applicable in which one or more of the walls of the base sub-assembly or the base sub-assembly extend beyond the walls of the wall assembly. In such case, the section of the bottom or top of the housing wall assembly 44 that does not form a continuous surface with the base or cover is received within U-shaped groove formed in the top of a base or bottom of a top having periphery that extends beyond that of the housing wall assembly. For example, in the hot water boiler of FIGS. 14, 15 and 16, the bottom of the forward wall 146 of the wall assembly 148 is received in a slot 150 formed in a forwardly extending section 152 of the base 154. In this particular embodiment, the forward wall 156 and back wall 158 are relatively straight and parallel while the two opposite side walls 160 and 162 are bowed outwardly to enhance rigidity of the wall assembly 148.

Moreover, it should also be appreciated that while the wall assembly is preferably formed from a single rectangular piece of steel that is bent at the four corners and then bent into a stressed configuration to adjoin opposite ends that are then fastened to each other by a weld, the housing wall assembly could also be formed of individual planer walls that are secured together by welds, L-shaped joints and then bent into the desired configuration to achieve bowing. Alternatively, the individual walls may be preformed into arcuate shapes and then fastened together.

Figure 8:
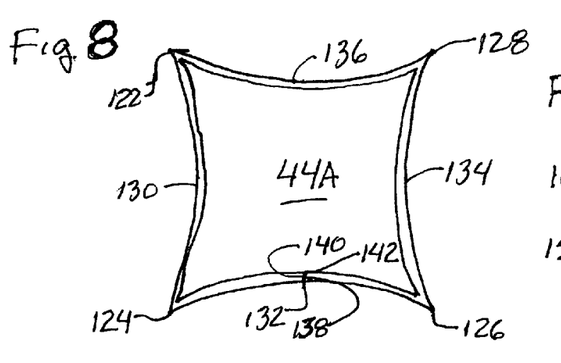
FIG. 8 is a plan view of another embodiment of the non-rectilinear housing wall assembly in which all of the walls are concave.
Figure 9:
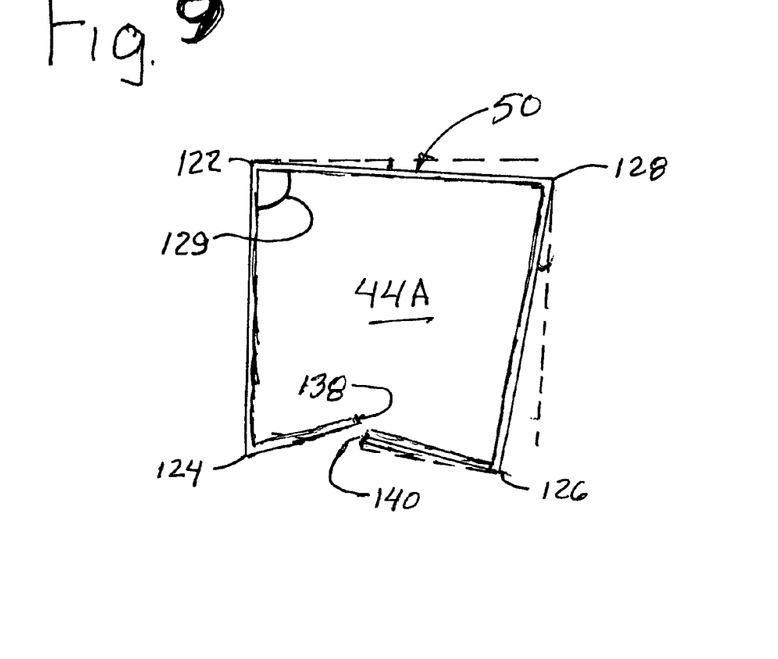
FIG. 9 is a plan view illustration of the bends made in the rectangular work-piece of FIG. 4 to form the cornered concave wall assembly of FIG. 8.

Referring now to FIGS. 8 and 9, an alternative embodiment 44A of the cornered arcuate housing for the food equipment apparatus 20 of FIG. 2 is seen to include four corners 122, 124, 126 and 128 that separate and define four walls 130, 132, 134 and 136. In this embodiment, instead of being convex, or bowed outwardly, the walls are concave, or bowed inwardly. This configuration is preferably achieved in a manner very similar as the convex configuration of FIG. 3 is achieved. As seen in FIG. 9, the rectangular work piece 50 of FIG. 4 is bent at the four corners 122, 124, 126 and 128 to form inwardly acute angles 129 that are less than 90-degrees, preferably 85-degrees to 75-degrees. The greater the acuteness of the bend, i.e. the less the angle of the bend relative to 90-degrees, the greater will be the inward amount of bowing when the opposite ends 138 and 140 are joined in aligned abutting relationship and welded together with a weld joint 142. Because of the acute bends, after the bends are made the ends tend to overlap and must be separated in order to join them in aligned abutting relationship. It is this strain that forces the walls to bow inwardly and enhances rigidity of the cross-section.

Figure 10:
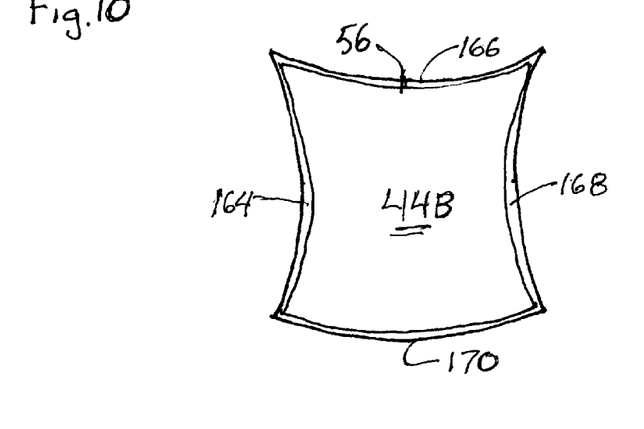
FIG. 10 is a plan view of another embodiment of the non-rectilinear housing wall assembly in which three of the walls are concave and one is convex.
Figure 11:
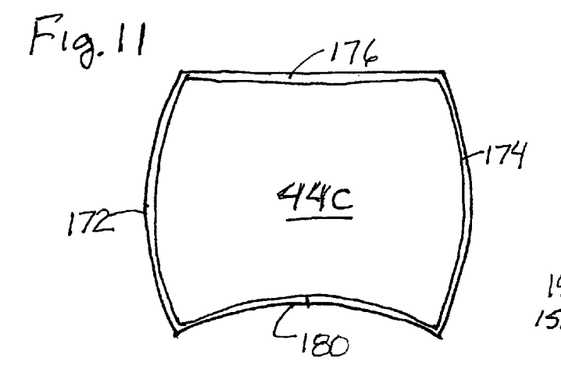
FIG. 11 is a plan view of another embodiment of the non-rectilinear housing wall assembly of FIG. 1 in which two of the walls are convex, one wall is concave and one is planer.
Figure 12:
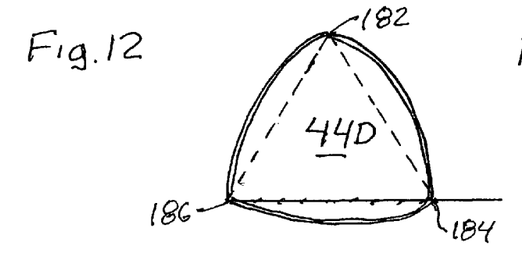
FIG. 12 is a plan view of another embodiment of the cornered arcuate housing assembly of FIG. 2 in which there are only three corners and three arcuate walls.
Figure 13:
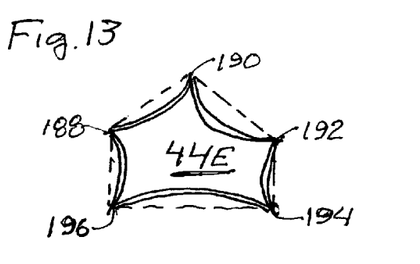
FIG. 13 is a plan view of another embodiment of the cornered arcuate housing assembly in which there are five corners and five arcuate walls.

Other cross-sectional configurations are contemplated by the present invention. For instance, with appropriate bend angles at appropriate corners, as discussed above, three of the walls 164, 166 and 168 of a wall assembly 44B may be concave while one wall 170 is convex, as shown in FIG. 10. Conversely, three of the walls may be convex while one of the walls is concave. As seen in FIG. 11, two opposite side walls 172 and 172 of a wall assembly 44C may be convex, while the back wall 176 may be planer and the front wall 178 may be concave. A front concave wall advantageously facilitates docking of a dispensing urn or the like with a cylindrical shape. Referring to FIG. 12, the wall assembly 44D may be made with only three corners 182, 184 and 186 with three intermediate walls that are either convex, by making the bend greater than 60-degrees, or concave, by making the bend less than 60-degrees. Referring to FIG. 13, the housing wall assembly 44E may have more than four corners, such as five corners 188, 190, 192, 194 and 196 with either convex walls or concave walls by appropriate selection of angles greater or lesser than 180-degrees divided by the number of corners.

Figure 14:
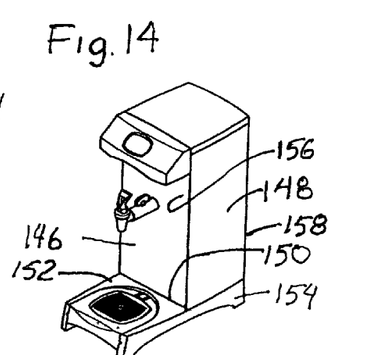
FIG. 14 is a perspective view of a hot water boiler, or hot water dispenser, that employs the present invention.
Figure 15:
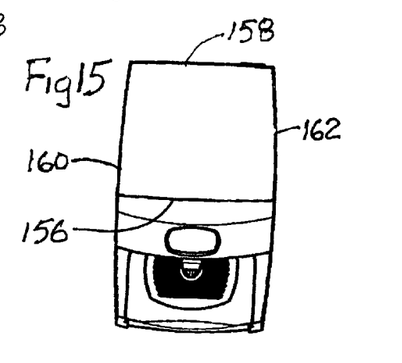
FIG. 15 is a plan view of the hot water boiler of FIG. 14 in which the base extends forwardly of the curved wall assembly and the support ledge is at the bottom of a slot formed in the forward portion of the base sub-assembly.
Figure 16:
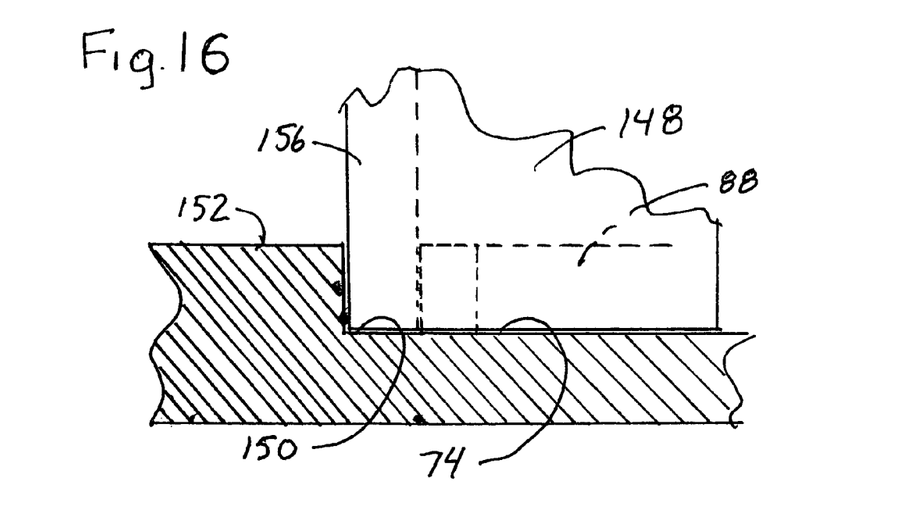
FIG. 16 is a cross-sectional view of a portion of the hot water boiler housing of FIGS. 14 and 15 illustrating the surface continuity of the bottom of the front wall panel mounting slot and the top surface of the support ledge.

As shown in FIGS. 14 and 15 and discussed above, the front and back walls 156 and 158 may be planer while the side walls 160 and 162 are convex. In such case, the obtuse angles are formed only in the side panels and not in the back panels. As in all configurations, the exact angles needed for a particular configuration are dependent upon the resiliency of the steel or other metal, the thickness and size of the work piece. In accordance with the method of the invention the actual number of degrees for the different folds and their location needed for a preselected cross-sectional configuration is determined by experiment. Such experiment can be based on the assumption that acute angles are needed for concave formation, obtuse angles are needed for the formation of convex panels and the larger the difference of the interior angle from ninety degrees, the larger will be the extent of curve that is formed in the panel.

Generally, the invention contemplates a method of making a housing assembly for a food processing apparatus by performing the steps of pre-forming a base closure with an upwardly facing and encircling support ledge having at least one curved section and forming a wall assembly from a planer, thin-walled, flexible work piece having a top, a bottom and a pair of generally parallel, elongate opposite ends extending between the top and the bottom. The wall assembly is made by first bending into the work piece a plurality of substantially straight folds that are generally parallel to the pair of opposite ends including at least one fold having an interior angle that is significantly greater than or lesser than a right angle. Then, after the plurality of substantially, straight folds are made, the opposite ends are brought together in mating relationship to flex at least an edge at the bottom of the work piece into a configuration congruent with the encircling support ledge. Then, while held in abutting aligned relationship, the opposite ends are attached together in abutting, mating relationship substantially along the entire length of the elongate opposite ends. The bottom edge of the completed wall assembly is then fitted on top of, and in supported relationship with respect to, the encircling ledge.

Preferably, the work piece is made of a thin-walled sheet of steel with a rectangular shape and the folds define corners that define wall panels of the wall assembly that extend between adjacent corners. In the case of a rectangular configuration there are four folds that define four corners located between a front wall panel, a back panel wall and a pair of opposite side wall panels. In one embodiment, the opposite side wall panels are resiliently flexed outwardly into a convex configuration when the opposite sides of the work piece are brought together in mating relationship and remain in a stressed condition after the opposite sides are attached together.

In another embodiment, opposite side wall panels are resiliently flexed, inwardly into a concave configuration when the opposite sides of the work piece are brought together in mating relationship and remain in a stressed condition after the opposite sides are attached together.

The formation of wall assemblies with all different combinations of convex, concave and planer wall panels are contemplated by the present invention as well as are wall assemblies with more or less than four wall panels.

In preferred embodiments, the method of assembly includes the steps of bending into the work piece at least one pair, if not two pairs, of adjacent folds, each having an interior angle less than ninety degrees or substantially greater than ninety degrees.

Figure 17:
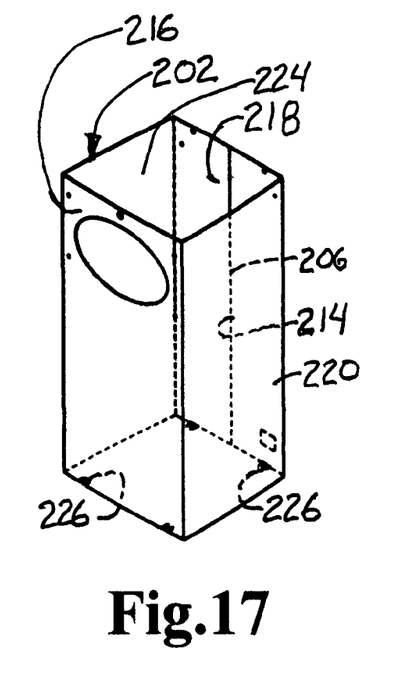
FIG. 17 is a plan view of a work piece of a preferred embodiment of the present invention.

Referring to FIG. 17 a rectangular work piece 200 is shown that is used to construct the housing section 202 of FIG. 17. The work piece 200 has a total length of 31.045 inches and a width of 17.748 inches. It is made of thin-walled 22-gauge 303-stainless steel or 304-stainless steel. A first fold line 204 is located 3.089 inches from the left edge 206 and is give a bend angle of 101-radial degrees. The second fold line 208 is located 11.297 inches from the left edge 206 and is given a bend angle of 95-radial degrees. The third fold line 210 is located 19.748-radial degrees from the left edge 206 and is given a bend angle of 95-radial degrees like that of fold line 208. The last fold line 212 is located 27.236 inches from the left edge 206 of the work piece 200 and is given a bend angle of 101-radial degrees like that of the first fold line 204.

Figure 18:
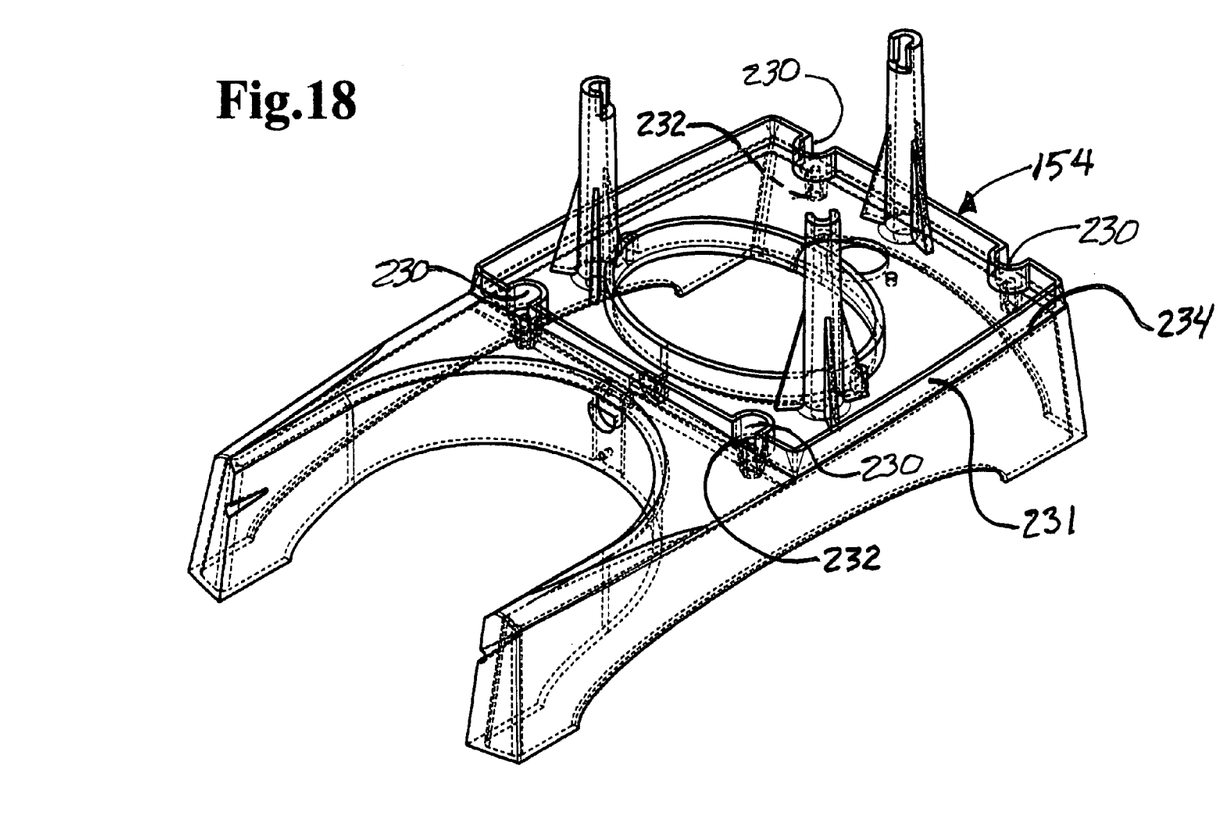
FIG. 18 is a perspective view of the work piece of FIG. 17 after it has been folded into a housing section with outwardly curved walls such as shown in FIG. 3.

When the folds are made and the left edge 206 is brought together in uniform abutting relationship with the right edge 214 and welded in place, the housing section 202 results with four outwardly curved walls: front wall 216, back wall 218, right wall 220 and left wall 224. The back wall 218 is formed by the two end sections of the work piece that are joined together at edges 206 and 214 and has a surface length that is approximately 8.451-inches and is equal in width to the front wall 216. Each of the side walls is approximately 7.488-inches. The curvature of the front and back wall 216 and 218 are equal, and the curvatures of the side walls 220 and 224 are equal to each other and slightly more curved than the front and back walls.

Figure 19:
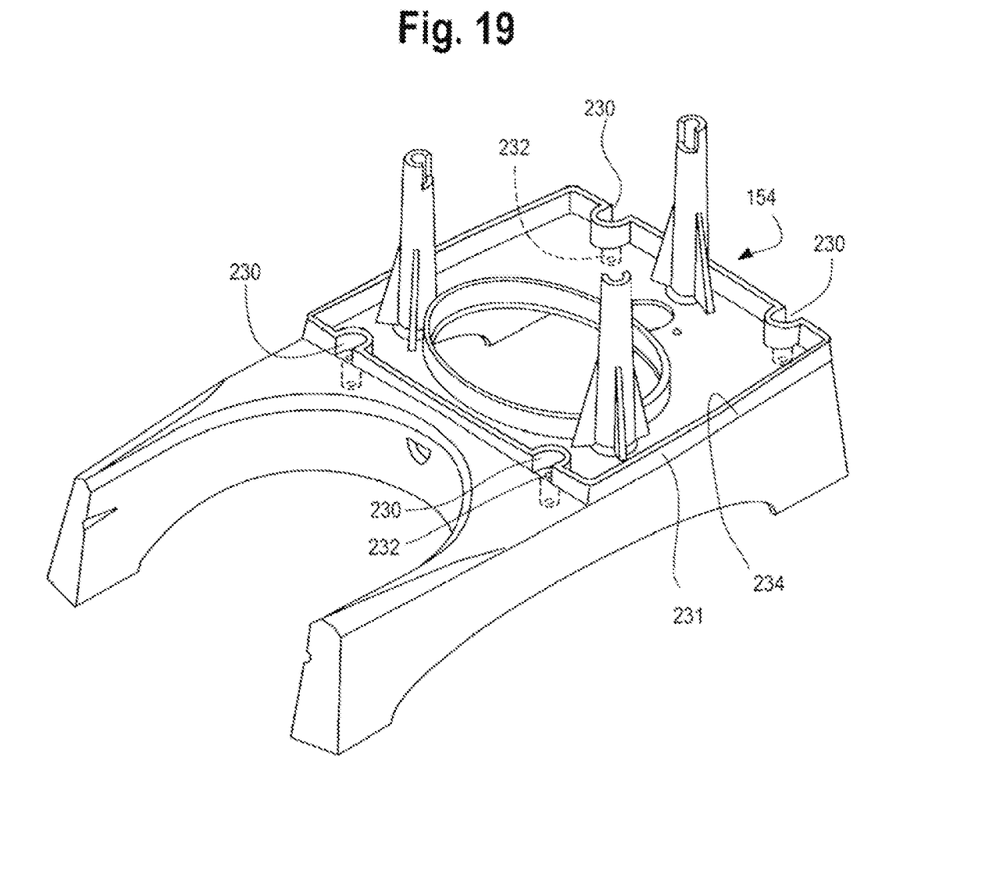
FIG. 19 is a perspective view of a preferred embodiment of a based upon which the housing section is mounted.

As seen in FIG. 19, the four mounting tabs 226 are folded inwardly. Referring to FIG. 19, the base 154 has four semi-cylindrical, vertical grooves 230 extending inwardly from a peripheral mounting wall 231 that slidably receive the four associated mounting tabs 226 when the housing section 202 is lowered down onto the base 154 during assembly. At the bottom of the grooves 230 are threaded bores 232 for receiving threaded fasteners (not shown) that pass through fastener holes in the tabs 226. The walls 216, 218, 220 and 224 adjacent bottom edge of housing section 202 surround, conform in shape to and abut the outer surface of the corresponding sides of the peripheral mounting wall 231. The bottom edge of the housing section 202 is supported on a ledge 234 surrounding mounting wall 231 and having a width that is equal to the thickness of the housing section walls. The snug fit of the housing section walls around the mounting wall 231 holds the housing section 202 against lateral movement relative to the base 154 and the threaded fasteners hold the housing section 202 in this secure position. Because the ledge 234 is the same width as the thickness of the work piece, the housing section 202 after being mounted to the base 154 forms a smooth continuous surface with the base side wall 236.

While a particular embodiment has been disclosed here, it should be appreciated that the food ingredient apparatus 20 and the housing assembly thereof may have different cornered arcuate or partly arcuate configurations without departing from the scope of apparatus and method of manufacture of the present invention.

The invention claimed is:

1. In a food processing apparatus having functional elements for the processing of food, a housing assembly for protectively enclosing the elements, comprising:
    an integral, tubular thin-sheet, resilient, metallic wall assembly made from a single, thin-walled work piece with
        an open top and an open bottom with cross-sectional shapes and sizes that are substantially the same,
    a tubular body extending between the open top and the open bottom and having a uniform cross-sectional shape and size substantially the same as the cross-sectional shapes and sizes of the open top and the open bottom, said tubular body having
        a plurality of substantially straight, parallel, elongate, bent corners with interior angles that are substantially different from a right angle,
        a single, thin-walled, metallic, resilient, rectangular work piece in which the bent corners are formed, said resilient rectangular work piece having a pair of opposite sides extending between the open bottom and the open top and substantially spaced from the bent corners,
        said resilient rectangular work piece having a plurality of resilient, integral panels respectively extending laterally between the plurality of bent corners and vertically between the open top and the open bottom,
            at least one of said resilient, integral panels being in a stressed state with opposed bent corners of each panel being in a squeezed together state stressing the resilient panel into an arcuate shape; and
        an elongate weld joint extending between the open top and the open bottom and fixedly attaching together the opposite ends of the work piece to hold the at least one resilient, integral panel in the stressed state and arcuate shape;
    a closure base attached to the bottom of the wall assembly to close and support the open bottom of the wall assembly; and
    a closure top attached to, supported by and closing the open top.

2. The food processing apparatus of claim 1 in which the closure base has an upwardly facing ledge for underlying support of the bottom of the tubular wall assembly, said ledge having a shape that closely conforms to the shape of the bottom of the tubular wall assembly including an arcuate section that conforms to the arcuate shape of the bottom of the at least one panel and the corner angles that are substantially different from a right angle.

3. The food processing apparatus of claim 2 in which
    the ledge has an inner side and an outer side, and
    the closure base includes a lateral support mounting wall that extends upwardly from the inner side of and conforms in shape to the ledge, said support wall blocking lateral movement of the bottom of the wall assembly off the ledge.

4. The food processing apparatus of claim 3 including a fastener for preventing vertical separation of the bottom of the wall assembly from the ledge and the lateral support wall.

5. The food processing apparatus of claim 4 in which the fastener is an adhesive.

6. The food processing apparatus of claim 4 in which the fastener is an elongate member received within mating, aligned, fattener openings in the wall assembly and the lateral support wall.

7. The food processing apparatus of claim 2 in which at least a part of the ledge is formed at the bottom of an upwardly facing slot formed in a portion of the base that extends beyond the wall assembly.

8. The food processing apparatus of claim 7 in which
    the thin-sheet work piece has a thickness, and
    at least a portion of the ledge has a thickness that is substantially the same as the thickness of the work piece.

9. The food processing apparatus of claim 2 in which
    the thin-sheet work piece has a thickness, and
    at least a portion of the ledge has a thickness that is substantially the same as the thickness of the work piece.

10. The food processing apparatus of claim 2 in which the closure top has a downwardly facing shoulder for support by the top of the tubular wall assembly, said shoulder having a shape that closely conforms to the shape of the top of the tubular wall assembly including an arcuate section that conforms to the arcuate shape of the top of the at least one panel and the corner angles that are substantially different from a right angle.

11. The food processing apparatus of claim 1 in which the closure top has a downwardly facing shoulder for support by the top of the tubular wall assembly, said shoulder having a shape that closely conforms to the shape of the top of the tubular wall assembly including an arcuate section that conforms to the arcuate shape of the top of the at least one panel and the corner angles that are substantially different from a right angle.

12. The food processing apparatus of claim 11 in which
the shoulder has an inner side and an outer side, and
the closure top includes a top lateral support mounting wall that extends downwardly from the inner side of, and conforms in shape to, the shoulder, said support wall blocking lateral movement of the bottom of the wall assembly off the ledge.

13. The food processing apparatus of claim 12 including a fastener for preventing vertical separation of the top of the wall assembly from the shoulder and the top lateral support wall.

14. The food processing apparatus of claim 13 in which the fastener is an adhesive.

15. The food processing apparatus of claim 13 in which the fastener is an elongate member received within mating, aligned, fastener openings in the wall assembly and the top lateral support wall.

16. The food processing apparatus of claim 11 in which at least a part of the ledge is formed at the bottom of an upwardly facing slot formed in a portion of the base that extends beyond the wall assembly.

17. The food processing apparatus of claim 16 in which
the thin-sheet work piece has a thickness, and
at least a portion of the shoulder has a thickness that is substantially the same as the thickness of the work piece.

18. The food processing apparatus of claim 11 in which
the thin-sheet work piece has a thickness, and
at least a portion of the shoulder has a thickness that is substantially the same as the thickness of the work piece.

19. The food processing apparatus of claim 1 in which the at least one of the panels being stressed is stressed into an inwardly extending concave shape.

20. The food processing apparatus of claim 19 in which at least one of the panels is stressed into an outwardly extending convex shape.

21. The food processing apparatus of claim 19 in which the at least one of the panels being stressed into an inwardly extending concave shape is a front panel.

22. The food processing apparatus of claim 19 in which two opposite side panels are stressed into an outwardly extending convex shape.

23. The food processing apparatus of claim 22 in which a back panel is substantially planer.

24. The food processing apparatus of claim 23 in which two opposite side panels are stressed into an outwardly extending convex shape.

25. The food processing apparatus of claim 19 in all of the panels are stressed into an inwardly extending concave shape.

26. The food processing apparatus of claim 1 in which there are four corners and four panels.

27. The food processing apparatus of claim 1 in which there are three panels and three corners.

28. The food processing apparatus of claim 1 in which there are five panels and five corners.

29. The food processing apparatus of claim 1 in the at least one of the panels being stressed into an arcuate shape is stressed into an outwardly extending convex shape.

30. The food processing apparatus of claim 29 in which at least two of the panels are stressed into an outwardly extending convex shape.

31. The food processing apparatus of claim 30 in which the at least two panels with the outwardly extending convex shape that define opposite sides of the wall assembly.

32. The food processing apparatus of claim 31 in which a third panel is substantially planer and defines a back of the wall assembly.

33. The food processing apparatus of claim 32 in which a fourth panel is substantially planer and defines a front of the wall assembly.

34. The food processing apparatus of claim 31 in which
a third panel defines a front of the wall assembly, and
the base has an underlying section and a forwardly extending section with a slot within which the third panel is received and which has a bottom defining a support ledge.

35. The food processing apparatus of claim 31 in which the third panel and the slot are both substantially straight.

36. The food processing apparatus of claim 35 in which the underlying section has a support ledge that is engaged by the two panels defining the sides of the wall assembly when the third panel is received within the slot in the forward section of the closure base.

37. The food processing apparatus of claim 1 in which the functional elements are functional elements for one of (a) a beverage brewer, (2) a food ingredient grinder and (3) a hot water boiler.

38. In a food processing apparatus having functional elements for the processing of food, a housing assembly for protectively enclosing the elements, comprising:
a thin-walled, integrally formed, steel wall assembly made from a single, thin-walled, work piece with
an open top and an open bottom extending between the top and the bottom,
a back planer panel,
a front planer panel,
a pair of opposite, outwardly bowed side panels joined at opposite back and front sides to the back planer panel and the front planer panel and held in a stressed state to form obtuse angles therewith and to enhance structural rigidity of the wall assembly;
a base closure for supporting the wall assembly in an upright position; and
a top closure attached to a top of the wall assembly.

39. The food processing apparatus of claim 38 in which the base closure has a support ledge for supporting the wall assembly with a shape that conforms to a cross-sectional shape of the wall assembly with a pair of opposite, parallel, front and back straight sections for support of the front panel and the back panel joined to a pair of opposite outwardly curved sections.

40. The food processing apparatus of claim 38 in which the base closure has a forward section with a slot having a bottom defining a front straight section of the support ledge positioned to mate with the bottom of the front panel when the bottom of the back panel and the side panels mate with the back section and the pair of outwardly curved side sections.

41. The food processing apparatus of claim 40 in which the panels have a preselected thickness and the support ledge has a width that is substantially equal to the thickness.

42. The food processing apparatus of claim 41 including an upwardly extending lateral support wall that conforms to the shape of the support ledge extends along an interior edge of the support ledge sections located without the slot.

43. The food processing apparatus of claim 38 in which the top closure has a support shoulder supporting by the top of the wall assembly with a shape that conforms to a cross-sectional shape of the top of the wall assembly with a pair of opposite, parallel, front and back straight sections for support by the front panel and the back panel joined to a pair of opposite outwardly curved side sections for support by the outwardly curved panels.

44. The food processing apparatus of claim 38 in which all the panels are integrally formed from a single, thin-walled work piece that has four folds defining the ends of the panels and a weld joint in one of the panels attaching together opposite ends of the work piece at a location spaced from all of the folds.

45. The food processing apparatus of claim 44 in which the work piece is made of stainless steel.

46. The food processing apparatus of claim 38 in which the pair of outwardly curved side panels are in a state of resilient stress.

* * * * *